United States Patent [19]

Peterson

[11] 4,174,912
[45] Nov. 20, 1979

[54] SYSTEM FOR HEAVE REDUCTION IN HIGHWAYS DUE TO FROST OR MOISTURE IN EXPANSIVE CLAY OR SHALE MATERIALS

[75] Inventor: Earl C. Peterson, Minneapolis, Minn.

[73] Assignee: Electroosmosis Inc., Minneapolis, Minn.

[21] Appl. No.: 929,428

[22] Filed: Jul. 31, 1978

[51] Int. Cl.$^2$ .............................................. E01C 3/06
[52] U.S. Cl. ........................................ 404/27; 404/17; 404/71; 404/76; 405/263
[58] Field of Search ............... 404/27, 17, 71, 72, 404/76; 166/248; 405/263, 258, 131

[56] References Cited

U.S. PATENT DOCUMENTS

| | | | |
|---|---|---|---|
| 849,524 | 4/1907 | Baker | 166/248 |
| 2,099,328 | 11/1937 | Casagrande | 405/131 X |
| 2,558,159 | 6/1951 | Sanick | 405/263 X |
| 2,837,984 | 6/1958 | Klotz | 404/27 X |
| 2,876,326 | 3/1959 | Akmentin | 404/17 X |
| 3,195,619 | 7/1965 | Tippmann | 404/71 X |
| 3,377,462 | 4/1968 | Pferschy | 404/71 |
| 3,490,241 | 1/1970 | Kuhn | 404/76 X |

Primary Examiner—Nile C. Byers, Jr.

Attorney, Agent, or Firm—Orrin M. Haugen; Thomas J. Nikolai

[57] ABSTRACT

Means for controlling the moisture content and ultimate freeze-thaw cycle parameters of a paved roadbed including, a combination of electrolytic means together with the conventional roadbed, the electrolytic means being utilized to control the moisture migration through the soil in and around the roadbed. The system comprises a combination of a roadbed having a centrally disposed paved zone flanked by lateral shoulder zones, and electrolytic means along the shoulder zone slopes for controlling the moisture migration through the surrounding soil. The electrolytic means includes a plurality of spaced electrodes, including a plurality of anodes and a plurality of cathodes arranged in spaced-apart but electrolytically coupled relationship along the lateral shoulder zone slopes. The anode means includes crushed rock high in certain metallic oxides, with the oxides selected from the group consisting of calcium oxide and magnesium oxide such as, for example, crushed dolomitic limestone or basalt. The anodes are arranged in generally parallelly disposed openings formed in the lateral shoulder slope areas. The cathode means includes pulverized coke, preferably metallurgical coke disposed in openings spaced from but adjacent to the anode openings, and being located either along the same side or the opposite side from the anodes.

4 Claims, 4 Drawing Figures

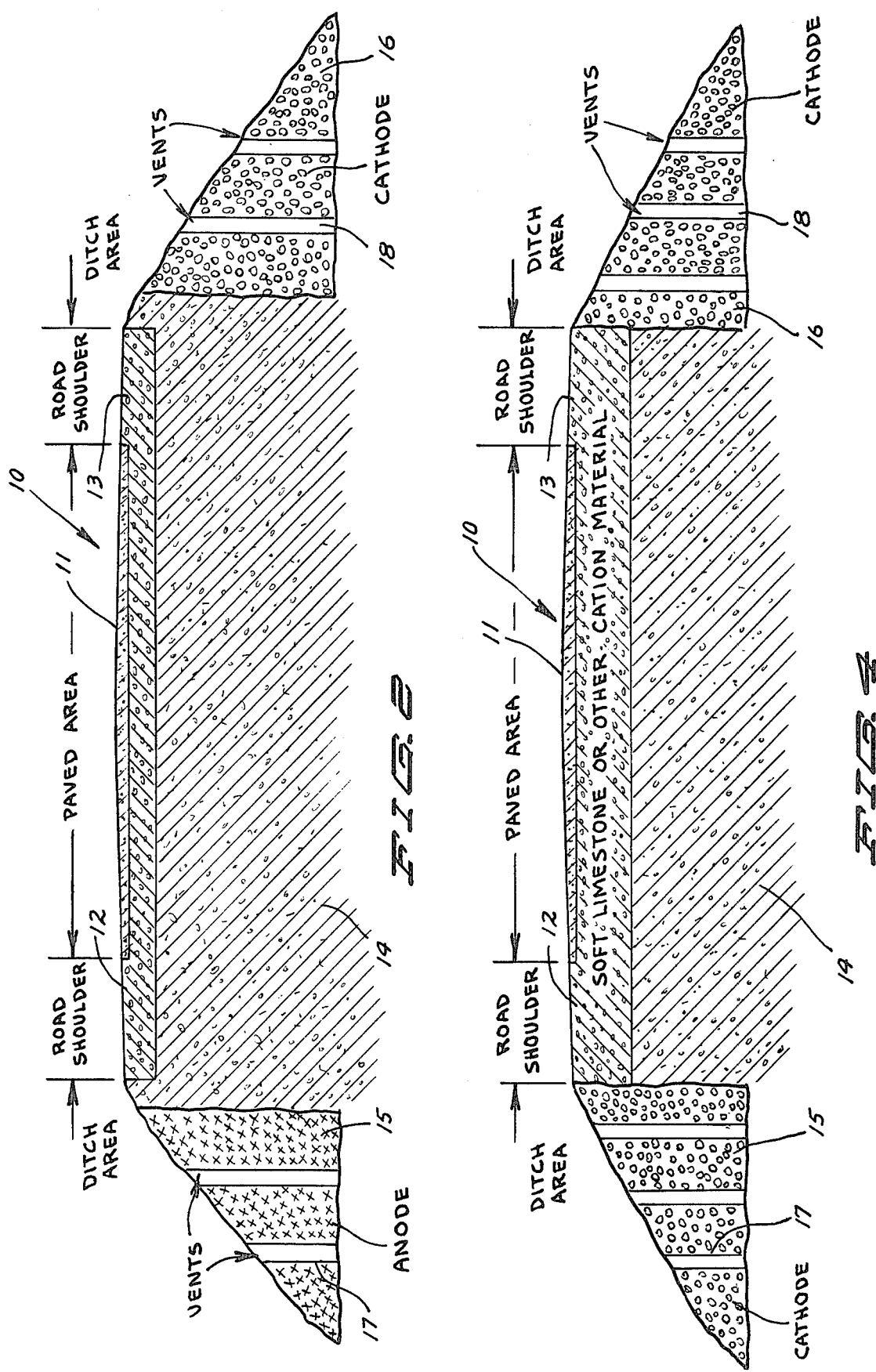

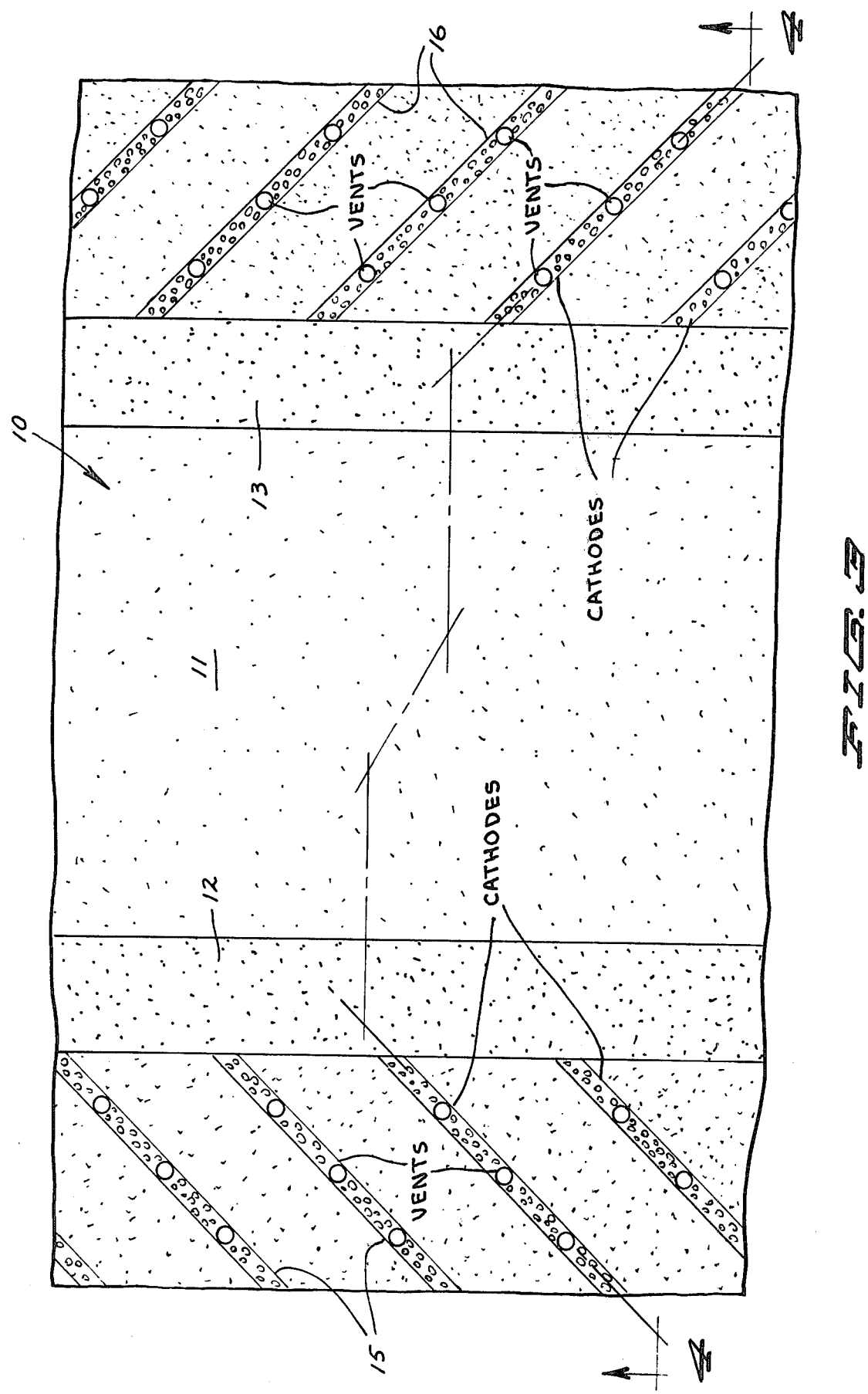

SYSTEM FOR HEAVE REDUCTION IN HIGHWAYS DUE TO FROST OR MOISTURE IN EXPANSIVE CLAY OR SHALE MATERIALS

REFERENCE TO RELATED PATENTS

The present invention is an improvement over that highway system disclosed in my prior U.S. Pat. No. 3,649,513 dated Mar. 14, 1972, and is related to the concept disclosed in my co-pending application Ser. No. 887,335, filed Mar. 16, 1978, and entitled "Sewage Osmosis System".

BACKGROUND OF THE INVENTION

The present invention relates generally to an improved system for control of moisture migration through the soil along, adjacent, and under paved roadbeds, and more specifically to an electrolytic means for the control of such moisture migration. The electrolytic means includes the provision of anodes and cathodes arranged in either spaced apart or oppositely disposed relationship along the paved zone, the anodes being formed from a crushed rock high in calcium and magnesium oxides, such as dolomitic limestone or basalt, with the cathodes being formed of electrically conductive carbon, and preferably metallurgical coke. With this arrangement of components, it has been found that moisture migration may be controlled through the soil structure disposed between the individual anodes and cathodes.

In the past, electro-osmosis has been utilized for control of moisture conditions in soil, such as, for example, for controlling the leeching of certain undesirable salts from soil structures. Normally, these systems have included the intentional disposition of water in the control area, with the application of an electrical field being utilized to exert an affect upon the soil, including affecting the salts which may be present in the soil. The present arrangement is utilized for the control of undesired moisture which may be present beneath roadbed surfaces, and with improved drainage of moisture from said areas.

In certain soils, such as, for example, clay soils and the like, it has been found that the application of an electrical field through the soil may enhance the ability of the soil to dispose of water and water particles.

In the application of the present concept to treatment of roadbeds, it is readily appreciated that damage to roadbeds occurs when the roadbed undergoes freeze-thaw cycles in the presence of excessive quantities of moisture. This moisture contributes to the formation of frost heaves and the heaves in expansive clay or shale materials in the roadbed, those heaves requiring extensive repair to restore the surface. The arrangement of the present invention enables the loss or dissipation of moisture from the area beneath the roadbed, thus decreasing the tendency toward frost heaves and the heaves from expansive clay or shale material.

SUMMARY OF THE INVENTION

Therefore, in accordance with the present invention, a roadbed is provided with an electrolytic means for the control of moisture migration through the soil beneath the roadbed, the electrolytic means including a plurality of spaced anodes and cathodes, the electrodes being disposed laterally along the shoulder areas of the roadbed, a plurality of anodes are formed, these anodes comprising a bed of crushed rock, with the rock being high in calcium and magnesium oxides, such as dolomitic limestone or basalt, and with the cathodes comprising particles of coke, preferably metallurgical coke, with the anodes and the cathodes each being formed in spaced apart but electrolytically coupled bores or channels formed in either oppositely disposed slope areas, or adjacent one another along the same side of the roadbed. There may be areas where soft limestone or other high calcium materials which ionize to form cations, may be used in the top area of subgrade when the road is constructed. These materials have hygroscopic properties which may attract and hold moisture which may be damaging to the roadbed. Such cationic materials carry a positive charge and if coke cathodes carrying a negative charge are constructed 20 to 30 feet apart on the slope on each side of the road, the cations appear to migrate in the soil to these cathodes. This will cause a drying action in the top subgrades of the road. In this case, the top of the road subgrade will act as the anode and the cathodes would be spaced 20 to 30 feet apart on both sides of the road in the ditch slope area.

These electrodes contribute to the impression of an electrical field across or through the subterranean area of the roadbed and have been found to enhance the control of moisture migration or permeation through the soil area. The resulting drying of the soil contributes to the reduction of the number of frost heaves and heaves from expansive clay or shale material occurring in the roadbed surface. This arrangement is particularly desirable for use in connection with bituminous pavement surfaces, but is also adaptable for use with pavement formed of concrete. In order to assist in the electrolytic behavior, vents are preferably employed between the electrodes and the atmosphere.

Therefore, it is a principal object of the present invention to provide for an improved electrolytic means for the control of moisture migration through the soil beneath paved zones of roadbeds.

It is yet a further object of the present invention to provide a plurality of spaced anode and cathode pairs along the sides of a paved zone of a roadbed, the anodes being formed of beds or columns of crushed rock selected from a rock high in the oxides of calcium and magnesium iron and aluminum, and with the cathodes being formed of coke.

It is yet a further object of the present invention to provide an improved system for the control of moisture migration in roadbed areas, and including a plurality of oppositely disposed anode and cathode pairs flanking a paved zone of a roadbed, with each electrode being provided with a vent to atmosphere.

Other and further objects of the present invention will become apparent to those skilled in the art upon a study of the following specification, appended claims, and accompanying drawings.

BRIEF DESCRIPTION OF THE DRAWINGS

FIG. 1 is a top plan view of a roadbed provided with spaced electrodes pursuant to the present invention;

FIG. 3 is a top plan view of an alternate arrangement of a roadbed provided with spaced electrodes pursuant to the present invention; and FIG. 4 is a vertical sectional view taken along the line and in the direction of the arrows 4—4 of FIG. 3.

DESCRIPTION OF THE PREFERRED EMBODIMENT

Figure 2:
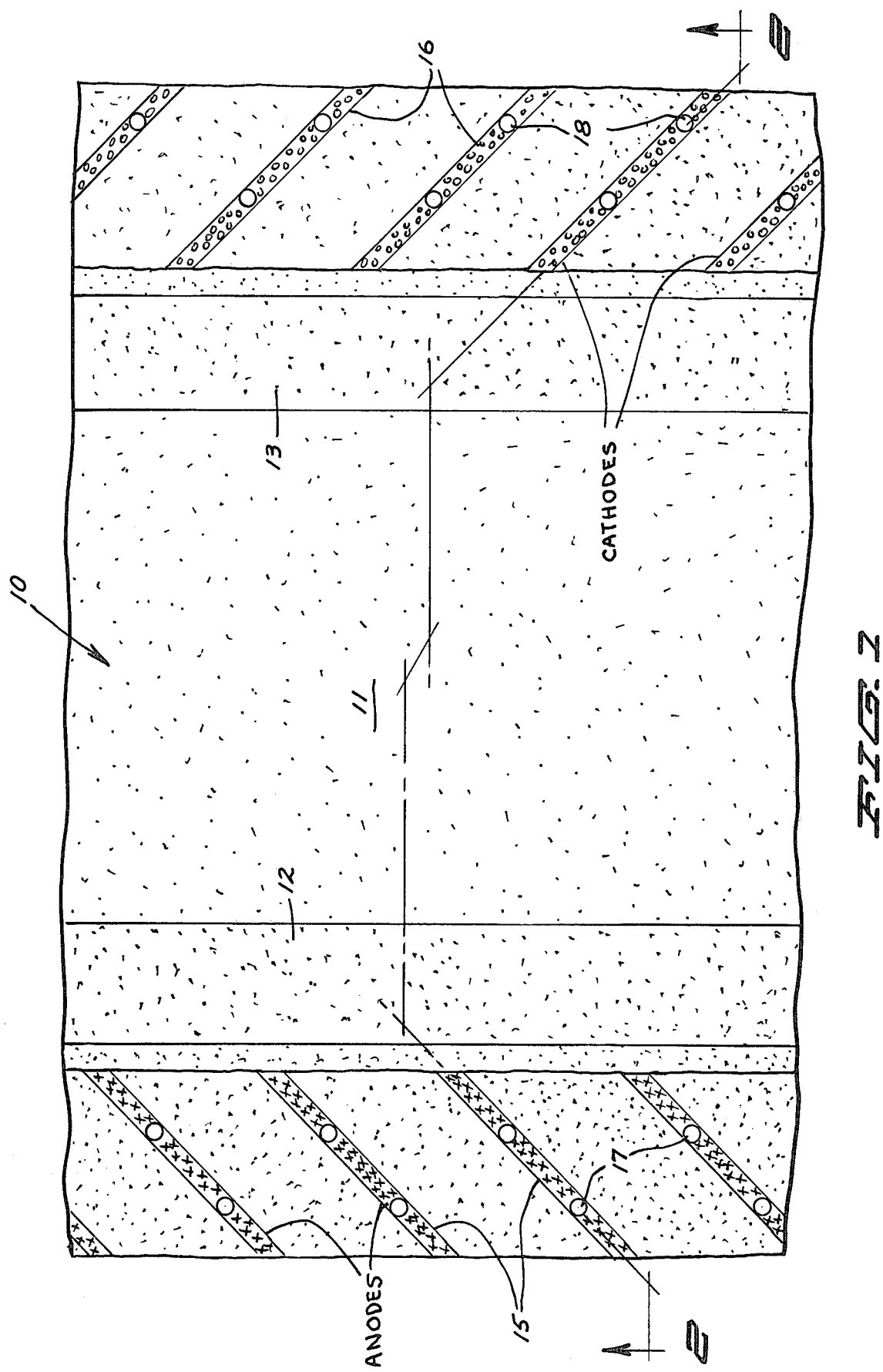
FIG. 2 is a vertical sectional view taken along the line and in the direction of the arrows 2—2 of FIG. 1.

In accordance with the preferred embodiment of the present invention, and with particular attention being directed to FIGS. 1 and 2 of the drawings, the roadbed system generally designated 10 includes a paved area 11 flanked by lateral shoulder zones 12 and 13. The paved zone is preferably comprised of bituminous material, but may, as indicated, be formed of concrete, and is disposed generally above the subterranean zone 14.

Electrodes are formed on opposite sides of the paved area, and in the laterally arranged ditch slope zones, these electrodes being shown at 15 and 16. Electrode 15 is an anode, and is preferably comprised of a crushed dolomitic limestone, with such limestone being high in calcium and magnesium oxides. The anode is normally disposed within a trench, having a width of about 2 feet, and a depth of between 5 and 6 feet, and a length of between about 5 and 6 feet. The anodes may be vented to atmosphere, as is ordinarily desirable, such as vents 17 and 18. For most purposes, a depth of between 5 and 6 feet extends below the normal frost line, although in some areas the frost level normally extends beneath a 5 or 6 foot depth. As is apparent in the view of FIG. 1, the individual electrodes are arranged at a 45° angle to the axis of the paved area, and this has been found to provide improved performance. Electrode spacing is preferably in the area of about 20 feet, with this spacing providing appropriate electrolytic coupling between individual cathode and anode pairs, with the pairs being formed either across the width of the highway, or adjacent one another on the same lateral sides of the highway.

The cathodes are formed from crushed coke, preferably metallurgical coke, with the cathodes being disposed in trenches of essentially the same size as the trenches forming the anodes, and are spaced apart in the same fashion as described in connection with the anodes. Metallurgical coke is preferable to petroleum coke, since metallurgical coke tends to be somewhat more electrically conductive, and furthermore has sufficient structural strength so as to avoid crushing within the cathode zone. When moisture is present in the roadbed, or in the area lateral of the bed, a field develops between the adjacent anodes and cathodes, with the amplitude or strength being sufficient to decompose water electrolytically.

As has been indicated, it is frequently desirable to provide vertical vents in the cathode area in particular, in order to prevent gas blocking in wet or compacted soil.

As is indicated in FIG. 1, the anodes are disposed along one side of the roadbed, with the cathodes being disposed along the opposite side of the roadbed. In certain installations, it is preferable to alternate anodes and cathodes along each side of the roadbed, thereby providing for a greater opportunity for electrolytic action to occur both beneath the roadbed in the area 14, and along the shoulder areas 12 and 13.

Ordinarily, crushed rock having a conventional size of about one inch in cross-section is preferred. Also, as previously indicated, dolomitic limestone, which is a material rich in oxides of calcium and magnesium is preferred.

DOLOMITIC LIMESTONE ANALYSIS

Dolomitic limestone has a formulation which is ordinarily determined by the quarry source. One such material is available from Koigloy Quarry of Santagium, Utah, and has the following analysis:

| | |
|---|---|
| Silicon oxide | 1.05% |
| Calcium oxide (CaO) | 31.91% |
| Magnesium oxide (MgO) | 19.78% |
| Iron oxide ($Fe_2O_3$) | .95% |
| $CO_2$ loss | 6.33% |

As an alternate source, the Flintkote Company, U.S. Lime Products Division of Sloan, Nevada produces dolomitic limestone in the following analysis:

| | |
|---|---|
| Magnesium carbonate ($MgCO_3$) | 44.00% |
| Calcium carbonate ($CaCO_3$) | 55.00% |
| Iron oxide ($Fe_2O_3$) | 0.10% |
| Aluminum oxide ($Al_2O_3$) | 0.20% |

An alternate source of anode material could be basalt as produced by Bryan Dresser Trap Rock of Dresser, Wisconsin, with the following analysis. This is an extremely hard material that does not attract moisture to it.

| PHYSICAL TESTS ON DRESSER TRAP ROCK | |
|---|---|
| Fusion (Degree F.) | 2206° |
| Toughness (ASTM D-3-18) | 19 |
| Hardness (Deval) | 3.2 |
| Specific Gravity (ASTM C-68-30) | 3.0 |
| Los Angeles Rattler (ASTM C-131-44) | 9.00% |
| Soundness (ASTM C-88-371) 25 cycles | under 1.00% |
| Soundness (ASCE Manual 13) 20 cycles | .17% |
| Absorption (ASTM D-55-25) | .40% |

| CHEMICAL ANALYSIS DRESSER TRAP ROCK | |
|---|---|
| Loss on Ignition | .25% |
| Silica | 45.90% |
| Iron oxide | 14.08% |
| Aluminum oxide | 17.35% |
| Calcium oxide | 8.93% |
| Magnesium oxide | 7.40% |
| Sodium oxide | 3.88% |

DESCRIPTION OF THE ALTERNATE PREFERRED EMBODIMENT

With attention being directed to FIGS. 3 and 4 of the drawings, it will be apparent that the structure of this embodiment, while similar to that of FIGS. 1 and 2, is somewhat different in that soft limestone or other material capable of cation generation is disposed beneath the paved area and road shoulder area, and thus is electrolytically coupled to the cathode zones disposed along the edge of the road. Since the substance of the compositions, formulations, as well as the arrangement of vents, etc. is otherwise similar to the embodiment illustrated in FIGS. 1 and 2, common reference numerals have been used throughout. The legends applied to the drawings assist in the comprehension of the arrangement.

I claim:

1. In combination with a roadbed having a centrally disposed paved zone flanked by lateral shoulder zones, electrolytic means for the control of moisture migration through the soil and comprising:
   (a) a plurality of spaced anode means disposed laterally along a side of said paved zone and generally equally spaced from the central axis of said roadbed, and a plurality of spaced cathode means disposed laterally along a side of said paved zone and electrolytically coupled to said anodes, and being generally equally spaced from the axis of said roadbed;
   (b) said anode means comprising a plurality of columns of particles of a stone having a relatively high calcium and magnesium oxide content, and being disposed in trenches formed along said roadbed; and
   (c) said cathode means comprising a quantity of coke particles disposed in trenches formed along said roadbed.

2. The combination as set forth in claim 1 being particularly characterized in that said anode means and said cathode means are each vented to atmosphere.

3. The combination as set forth in claim 1 being particularly characterized in that said coke is metallurgical coke.

4. In combination with a roadbed having a centrally disposed paved zone flanked by lateral shoulder zones, electrolytic means for the control of moisture migration through the soil and comprising:
   (a) anode means disposed adjacent said paved zone, and a plurality of spaced cathode means disposed adjacent said paved zone and electrolytically coupled to said anodes;
   (b) said anode means comprising a plurality of particles of a stone having a relatively high calcium and magnesium oxide content; and
   (c) said cathode means comprising a quantity of coke particles.

* * * * *